United States Patent [19] [11] Patent Number: 4,539,219
Yamanishi et al. [45] Date of Patent: Sep. 3, 1985

[54] METHOD FOR COATING OPTICAL TRANSMISSION GLASS FIBERS

[75] Inventors: Toru Yamanishi; Katsuyuki Tsuneishi; Masaaki Yoshida, all of Kanagawa, Japan

[73] Assignee: Sumitomo Electric Industries, Ltd., Osaka, Japan

[21] Appl. No.: 691,791

[22] Filed: Jan. 16, 1985

Related U.S. Application Data

[62] Division of Ser. No. 529,779, Sep. 6, 1983, Pat. No. 4,512,281.

[30] Foreign Application Priority Data

Sep. 3, 1982 [JP] Japan ................... 57-154335
Dec. 22, 1982 [JP] Japan ................... 57-223896

[51] Int. Cl.³ ............................. B05D 1/04
[52] U.S. Cl. ..................... 427/32; 427/163; 427/168; 427/421; 427/425
[58] Field of Search ............. 427/32, 27, 163, 168, 427/421, 425

[56] References Cited

U.S. PATENT DOCUMENTS

| 4,246,299 | 1/1981 | Ohls | 427/163 |
| 4,249,925 | 2/1981 | Kawashima et al. | 427/163 |
| 4,317,667 | 3/1982 | Spainhour | 427/163 |
| 4,334,733 | 6/1982 | Takeshima et al. | 427/163 |

Primary Examiner—Richard Bueker
Attorney, Agent, or Firm—Sughrue, Mion, Zinn, Macpeak & Seas

[57] ABSTRACT

A method and apparatus for coating optical transmission glass fibers with a resinous composition. A vessel is provided through which a glass fiber is drawn. While it is being drawn through the vessel, the fiber is spun, and a resin coating is applied. In order to maintain the air pressure within the vessel fairly constant, an exhaust vent is provided through which excess particles of the resinous composition may escape. Turbulence is thus substantially reduced preventing the fiber from swinging and allowing the particles to be sprayed smoothly. Further, the particles may be electrically charged so that they are both attracted to the optical fiber and repel one another during flight. The invention employs both of these features to produce a uniform coat on an optical transmission glass fiber.

1 Claim, 6 Drawing Figures

FIG.5
FIG.4
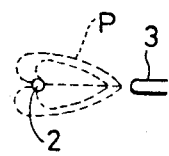
FIG.6
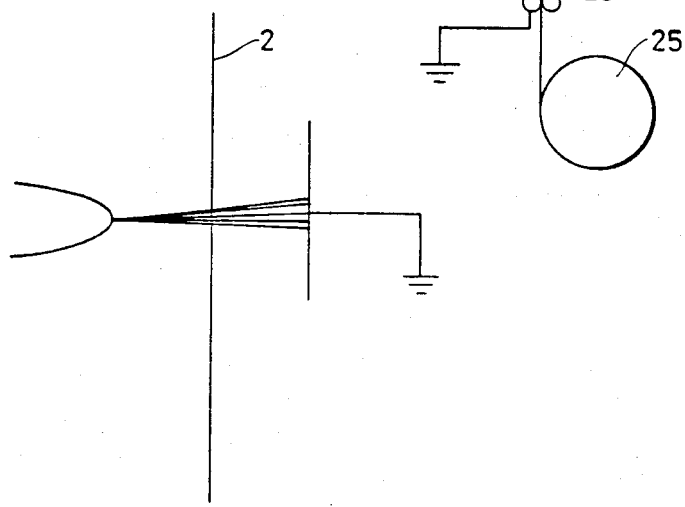
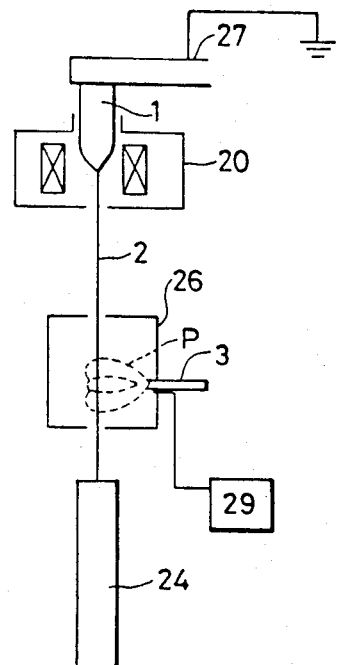

METHOD FOR COATING OPTICAL TRANSMISSION GLASS FIBERS

This is a division of application Ser. No. 529,779, filed Sept. 6, 1983 now U.S. Pat. No. 4,512,281.

BACKGROUND OF THE INVENTION

The present invention relates to a method for resin-coating optical transmission glass fibers.

Optical transmission glass fibers (hereinafter referred to as "optical fibers") have excellent transmission characteristics of high capacity and low loss. Furthermore, a transmission line using a optical fiber has no electrical inductance. Optical fibers are also light in weight. Due to these and other advantages, transmission systems utilizing optical fibers have been rapidly developed and put to practical use.

Since optical fibers are made of glass and can have a diameter as small as 200 $\mu$m or less, mechanical strength is a very significant consideration. In order to improve the mechanical strength of an optical fiber cable, a tandem primary coating method has been employed in which an optical fiber base material is melted using a resistance furnace, a high-frequency induction furnace, a $CO_2$ laser, an oxyhydrogen flame, etc. The optical fiber is thereafter drawn, and a resinous composition immediately coated onto the bare glass fiber and hardened. This retains the original strength of the glass and prevents the optical fiber from being damaged (see Japanese Published Patent Application No. 100734/76).

In applying the resinous composition coating, a die dipping method, a felt coating method, a spraying method, and the like have been used. Each method has specific advantages and disadvantages. Of these methods, the die dipping method and the spraying method are superior in that the resinous composition can be coated onto the fiber without contacting the fiber. Therefore, these two methods are used most widely. In particular, the spraying method is most suitable for high-speed coating because glass fibers while drawing at a high speed are subject to less influence due to temperature. The influence of temperature is a serious problem with the die dipping method. Furthermore, a coating film having a thickness of 2-3 $\mu$m or less can only be obtained by employing the spraying method. On the other hand, the spraying method is disadvantageous in that the thickness of the coating film obtained by a single coating is limited, and also it is difficult to control the thickness thereof.

A conventional apparatus used in practicing the spraying method will hereinafter be explained.

In FIG. 1, an optical fiber 2 resulting from melt-drawing of a preform 1 is drawn downwardly and vertically. A resinous composition is coated onto the optical fiber 1 by a sprayer 3. The sprayer 3 may, for instance, be a spraygun such as the Model HP-PC102 produced by Olympus Co., Ltd. of Japan.

In order to recover the excess sprayed resinous composition and to prevent it from contaminating the surrounding area, spraying is usually performed in a spray coating vessel 4 which is closed except for holes through which the optical fiber passes. A feed unit 6 provides the sprayer 3 with the resinous composition as shown in FIG. 1.

The resinous composition is sprayed at a pressure of from 0.1 to 5 kg/cm² by means of the sprayer 3. Because the spray coating vessel 4 is effectively closed, turbulence is produced and a good spray stream cannot be obtained. This tends to cause the optical fiber to swing out of position, making it impossible to uniformly coat it with the resinous composition.

SUMMARY OF THE INVENTION

The present invention is directed to improvements in the prior art spraying method and provides a method which enables formation of a coating film of uniform thickness at high speeds.

While practicing the spraying method described above, it is difficult to coat the optical fiber uniformly. However, this method possesses an advantage in that it is possible to form a coating having a thickness as low as 2-3 $\mu$m or less. The present invention improves upon this conventional spraying method by providing a method which yields uniform coating.

According to the present invention, an exhaust vent is formed in the vessel in which the resinous composition is sprayed and coated. Furthermore, a high DC voltage can be applied to the top portion of the sprayer, thus causing the sprayed resinous composition to be electrically charged. The magnitude of the DC voltage applied to the top of the sprayer is not critical; any voltage in a range of about 5 to 60 KV will suffice. The amount of electrical charge carried by the particles of the resinous composition is one of the factors determining the amount of the resinous composition coated onto the optical fiber. Therefore, by changing the applied voltage, it is possible to determine the film thickness obtained in a single coating operation.

There is no limitation on the type of resinous composition used with the invention; any resinous composition conventionally used in the coating of optical transmisson glass fibers can be used. Preferred resinous compositions are those containing epoxy resins, urethane resins, polyester resins, etc. which are hardened by application of heat, ultraviolet ray, electron beam, etc. Furthermore, it is desirable that the resin have a viscosity of 500 cps or less so that it can be sprayed. It is possible to lower the apparent viscosity of the resin by maintaining the temperature of the coating unit or the sprayer at 60° to 80° C.

BRIEF DESCRIPTION OF THE DRAWINGS

FIG. 4 is a schematic view showing a coating mechanism according to the method of the invention;

FIG. 5 is a schematic diagram showing a third preferred embodiment of a coating apparatus of the invention; and FIG. 6 is a view showing a preferred embodiment of a particular part of the invention.

DESCRIPTION OF THE PREFERRED EMBODIMENTS

The present invention will hereinafter be explained with reference to FIGS. 2 and 3.

Figure 2:
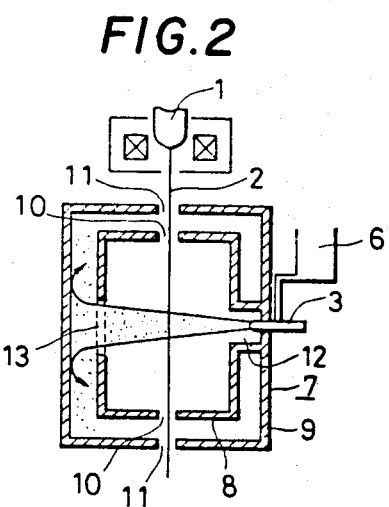
FIGS. 2 and 3 illustrate in cross section two embodiments of an apparatus for resin coating optical fibers constructed in accordance with the invention.

In FIG. 2, a resinous composition spray coating vessel 7 is composed of an inner casing 8 and an outer casing 9. In the center of the upper and lower sides of the casings 8 and 9 are formed optical fiber passing holes 10 and 11 through which a spinning optical fiber 2 is drawn downward and vertically. A spray hole 12 is formed through the inner and outer casings for receiving a sprayer 3.

When the resinous composition is sprayed through the nozzle of the sprayer 3, particles of the resinous composition pass across a line connecting the optical fiber passing holes 10 and 11 and reach the side wall of the inner casing 8. At the point where the particles would otherwise reach the side wall, an exhaust vent 13 is formed in the inner casing 8. Thus, the particles of the resinous composition pass through the exhaust vent 13 and are recovered in the space between the inner casing 8 and the outer casing 9. While the optical fiber 2 is passing through the holes 10 and 11 and is drawn from the vessel 7 while continuously spinning, the particles of the resinous composition sprayed from the nozzle of the sprayer 3 strike the optical fiber 2. This results in coating the resinous composition onto the surface of the optical fiber 2. The nonadhering particles of the resinous composition pass through the exhaust vent 13 and disperse upon striking the inner wall of the outer casing 9. These particles are recovered in the space between the inner casing 8 and the outer casing 9.

Figure 3:
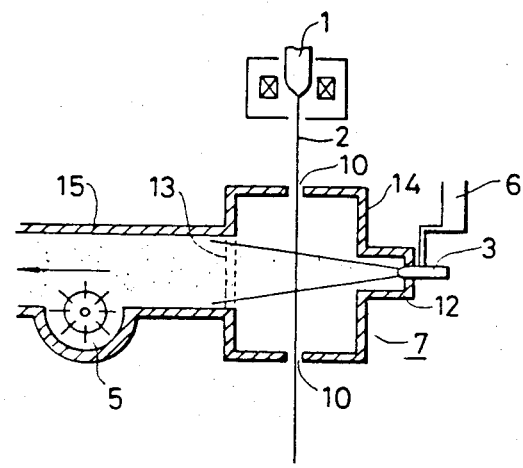

In the embodiment of FIG. 3, a spray coating vessel 7 is shown including a casing 14, an exhaust pipe 15 connected to the casing 14 where an exhaust vent 13 is formed, and an exhaust blower 5 provided in the exhaust pipe 15. Optical fiber passing holes and a spray hole are provided as in the conventional apparatus. When the resinous composition is sprayed from the nozzle of the sprayer 3 through a spray hole 12, particles pass across the line connecting the optical fiber passing holes 10 and 11 and reach the side wall of the casing 14. At the point where the particles of the resin composition would otherwise reach the side wall, an exhaust vent 13 is formed in the casing 14. The exhaust blower 5 is provided in the exhaust pipe 15 adjacent to the exhaust vent 13. Excess resinous composition not adhering to the surface of the optical fiber is recovered by means of the exhaust blower 5.

In accordance with the present invention, as described above, an exhaust vent is formed in the wall of a spray coating vessel at a point where the resinous composition sprayed from the nozzle of a sprayer would otherwise strike the wall. With this arrangement, the resinous composition spray causes less turbulence inside the coating vessel. Thus, a stable spray is obtained, the optical fiber is prevented from swinging out of position, and a uniform resinous coating on the optical fiber results. The method of the invention permits the stable formation of a coating which is 2–3 μm or less in thickness. In particular, the use of a blower 5 as shown in FIG. 3 enables a more stabilized resinous composition spray.

In FIGS. 4–6, an optical fiber formed from an optical fiber preform is shown. The optical fiber itself is slightly positively charged due to the thermal decomposition of glass molecules and other phenomena. It is therefore desirable that the particles of the resinous composition be negatively charged to make them adhere better. As illustrated schematically in FIG. 4, fine particles P of the resinous composition from the sprayer 3 are then attracted to the fiber by the resulting Coulomb force. When fine particles of the resinous composition are charged with the same polarity, they repel each other during flight. This prevents them from accumulating in any one region, and thus ensuring the uniformity of the coating.

Figure 1:
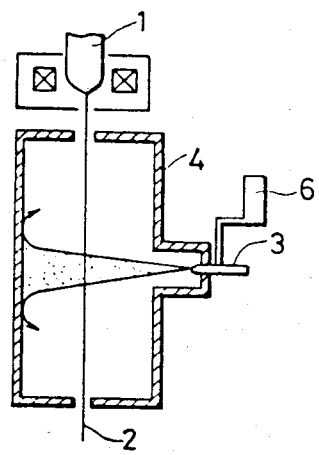
FIG. 1 shows in cross section an apparatus for resin coating optical transmission glass fibers according to a conventional spraying method.

As shown in FIG. 5, in accordance with the invention, an optical fiber 2 is drawn from a preform 1 through a spinning furnace 20. The optical fiber 2, which is slightly positively charged, is sprayed with fine particles P of a resinous composition by means of a sprayer 3. On the top portion of the sprayer 3 is applied a high DC voltage by a DC source 29. The optical fiber 2 having the resinous composition coating thereon is passed through a hardening furnace 24 and wound on a winding machine 25. The excess particles of the resinous composition are recovered in a recovery unit 26. A vessel similar to that shown in FIGS. 1, 2 and 3 may be used. The amount of the resinous composition deposited can be increased by providing a grounding connection 27 to the optical fiber preform or a grounding connection 28 to the optical fiber at the point where the resinous composition is hardened after passage through the hardening furnace 24.

As illustrated in FIG. 6, it is also possible to charge the optical fiber 2 with an electric charge of opposite polarity to that of the particles of the resinous composition by the application of a glow discharge, continuous corona discharge, and other methods. Experiments have confirmed that the amount of resin deposited when the optical fiber is positively charged by application of a high DC voltage and the particles are negatively charged is two to three times that when only the optical fiber is charged. It is also possible to negatively charge the optical fiber and to positively charge the particles of the resinous composition.

Techniques for spraying the resinous composition according to the present invention include a spraying method in which a stream of compressed air, dry nitrogen, or similar gases is used, a method in which a centrifugal force is applied by rotating a disc or other device, and other methods.

We claim:

1. A method for resin-coating an optical transmission glass fiber comprising the steps of:
   spinning an optical transmission glass fiber around a longitudinal axis thereof;
   spraying particles of a resinous composition toward said glass fiber; and
   charging said particles with a charge of a polarity opposite a polarity of said fiber.

* * * * *